United States Patent
Bauer et al.

(10) Patent No.: US 11,492,187 B2
(45) Date of Patent: Nov. 8, 2022

(54) CUSTOM PACKAGING AND PROCESS FOR FORMING THE CUSTOM PACKAGING

(71) Applicant: HOLLYMATIC CORPORATION, Countryside, IL (US)

(72) Inventors: Erik Bauer, Alto, MI (US); Victor Guynn, Romeoville, IL (US); David Baarman, Fennville, MI (US)

(73) Assignee: HOLLYMATIC CORPORATION, Countryside, IL (US)

( * ) Notice: Subject to any disclaimer, the term of this patent is extended or adjusted under 35 U.S.C. 154(b) by 0 days.

(21) Appl. No.: 16/962,101

(22) PCT Filed: Nov. 14, 2019

(86) PCT No.: PCT/US2019/061354
§ 371 (c)(1),
(2) Date: Jul. 14, 2020

(87) PCT Pub. No.: WO2020/102470
PCT Pub. Date: May 22, 2020

(65) Prior Publication Data
US 2020/0361686 A1     Nov. 19, 2020

Related U.S. Application Data

(60) Provisional application No. 62/767,665, filed on Nov. 15, 2018.

(51) Int. Cl.
*B65D 75/38* (2006.01)
*B65D 75/32* (2006.01)
(Continued)

(52) U.S. Cl.
CPC .............. *B65D 75/38* (2013.01); *B29C 51/00* (2013.01); *B65B 5/04* (2013.01); *B65D 75/322* (2013.01);
(Continued)

(58) Field of Classification Search
CPC ........ B65D 75/52; B65D 75/38; B65D 77/22; B65D 77/04; B65D 75/322; B65D 81/05;
(Continued)

(56) References Cited

U.S. PATENT DOCUMENTS

2008/0265733 A1   10/2008   Hue et al.
2011/0067432 A1   3/2011   Cai

FOREIGN PATENT DOCUMENTS

JP     2006-052018 A    2/2006
KR   10-2013-0039083 A    4/2013

OTHER PUBLICATIONS

Written Opinion for PCT/US2019/061354, dated Feb. 6, 2020.
International Search Report for PCT/US2019/061354, dated Feb. 6, 2020.

Primary Examiner — Monica A Huson
(74) Attorney, Agent, or Firm — Sughrue Mion, PLLC

(57) ABSTRACT

A package and a method of forming the package, the package including a primary package; an inner package provided around the primary package; an outer package provided around the inner package and the primary package, such that an air gap is formed between the inner package and the outer package, the outer package including two bodies that are configured to surround opposite sides of the inner package, respectively; and a tape configured to seal the two bodies of the outer package together.

11 Claims, 17 Drawing Sheets

(51) Int. Cl.
    *B65D 75/52*     (2006.01)
    *B65D 77/04*     (2006.01)
    *B65D 77/22*     (2006.01)
    *B65D 81/05*     (2006.01)
    *B29C 51/00*     (2006.01)
    *B65B 5/04*     (2006.01)

(52) U.S. Cl.
    CPC ............. *B65D 75/52* (2013.01); *B65D 77/04* (2013.01); *B65D 77/22* (2013.01); *B65D 81/05* (2013.01); *B65D 2577/041* (2013.01)

(58) Field of Classification Search
    CPC .. B65D 77/00; B65D 2577/041; B29C 51/00; B65B 5/04; Y02W 30/80
    See application file for complete search history.

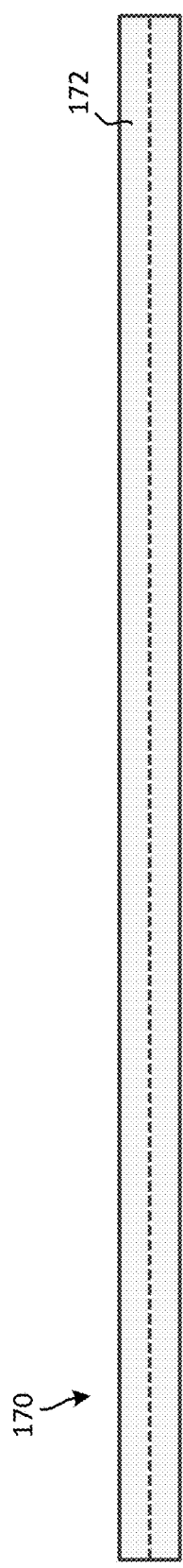
FIG. 9A
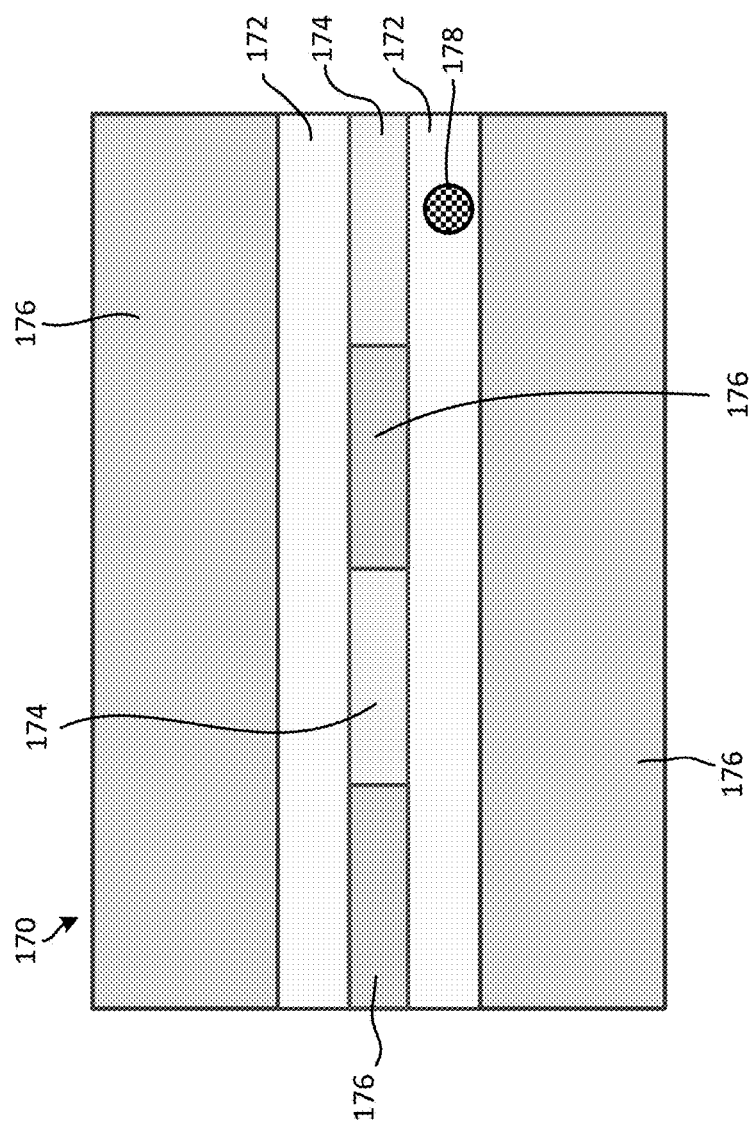
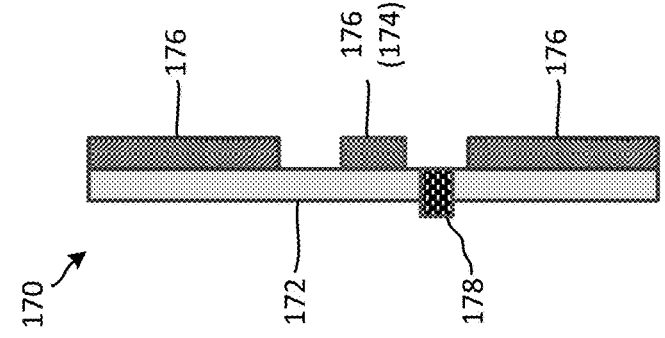
FIG. 9B

CUSTOM PACKAGING AND PROCESS FOR FORMING THE CUSTOM PACKAGING

REFERENCE TO RELATED APPLICATIONS

This application claims priority from U.S. Provisional Application No. 62/767,665, filed on Nov. 15, 2018, the disclosure of which is incorporated herein by reference in its entirety.

BACKGROUND

Technical Field

Embodiments relate to a custom packaging, and a method to automate secondary packaging and support for shipping.

Description of Related Art

In related art packaging, packaging with Styrofoam peanuts, plastic bags filled with air, or a bag that is then filled with expanding foam have been used.

Some known problems of related art technologies relate to a predetermined design and fabrication process to allow a primary package to fit within a secondary package. Inadequate flexibility of manufacturing is one of the issues that the related art includes. For example, it can be difficult selecting, designing, and formatting the distribution packages for distribution in distribution centers.

In related art manufacturing processes, automated packaging manufacturing folding boxes and spacers as a part of the conveyor system and packaging staging have been used.

Some known problems of related art manufacturing processes relate to a predetermined requirement for prefabricated manufactured packages in the fabrication process to allow secondary package to be timed in manufacturing with a primary package. Inadequate flexibility of manufacturing is one of the issues that the related art includes. For example, it can be difficult selecting, designing, and formatting the distribution packages for distribution.

SUMMARY

The present disclosure addresses several matters such as those described above, and other matters not described above. The present disclosure has several key solutions to past problems that have been observed and modified for better results in the production or distribution environment.

For example, a recyclable plastic film based package manufacturing system of a non-limiting embodiment is designed to allow real time package creation. Air may be used as a protective cushion between inner and outer forms. A vent may be used to allow limited air movement without impacting protection.

In a first aspect, at least one non-limiting embodiment of this disclosure enables faster, more reliable packaging solutions with better shipping performance. Past solutions are not designed for in line automation and manufacturing.

In a second aspect, at least one non-limiting embodiment of this disclosure enables secondary packaging and additional protections.

In a third aspect, at least one non-limiting embodiment of this disclosure enables a very simple way to open a package that is consumer friendly.

In a fourth aspect, at least one non-limiting embodiment of this disclosure is related to the balance of atmospheric pressures and pressures created when crushing the package.

In a fifth aspect, at least one non-limiting embodiment of this disclosure allows a process of building custom packages to be automated and performed in-line as a product moves down the production line.

In some embodiments, a package is provided. The package comprising a primary package; an inner package provided around the primary package; an outer package provided around the inner package and the primary package, such that an air gap is formed between the inner package and the outer package, the outer package comprising two bodies that are configured to surround opposite sides of the inner package, respectively; and a tape configured to seal the two bodies of the outer package together.

In an embodiment, the outer package is provided around the inner package and the primary package, such that the air gap surrounds the primary package. In an embodiment, the inner package includes a body, configured to surround a part of the primary package, and a flange extending from the body of the inner package, and the flange is configured to suspend the inner package and the primary package, within the outer package, when the outer package is provided around the inner package and the primary package.

In an embodiment, at least one of the outer package and the tape includes a vent that is configured to allow air to pass between an outside of the outer package and an inside of the outer package. In an embodiment, the outer package includes the vent that is configured to allow the air to pass between the outside of the outer package and the inside of the outer package. In an embodiment, the tape includes the vent that is configured to allow the air to pass between the outside of the outer package and the inside of the outer package.

In an embodiment, the inner package includes a body, configured to surround a part of the primary package, and a flange extending from the body of the inner package, the outer package includes a first body of the two bodies, configured to surround a part of the inner package, and a flange extending from the first body of the outer package, and the flange of the outer package contacts the flange of the inner package.

In an embodiment, the two bodies of the outer package are separated from each other by a gap of air where the tape is configured to seal the two bodies of the outer package together.

In some embodiments, a method is provided of forming a package that includes a primary package, an inner package configured to surround the primary package, an outer package including two bodies that are configured to surround opposite sides of the inner package, respectively, and tape. The method comprises providing the outer package and the inner package around the primary package such that the outer package is provided around the inner package and the primary package, including: providing the inner package around the primary package, and providing the outer package around the inner package such that an air gap is formed between the inner package and the outer package. The method further comprises sealing the two bodies of the outer package together with the tape after providing the inner package and the outer package around the primary package.

In an embodiment, the providing the outer package and the inner package around the primary package includes providing the two bodies of the outer package around two bodies of the inner package, respectively, before providing the inner package around the primary package. In an embodiment, the providing the outer package and the inner package around the primary package includes providing the two bodies of the outer package around two bodies of the inner package, respectively, after providing the inner package around the primary package.

In an embodiment, the outer package is provided around the inner package and the primary package, such that the air gap surrounds the primary package. In an embodiment, the inner package includes a body, configured to surround a part of the primary package, and a flange extending from the body of the inner package, and the flange is configured to suspend the inner package and the primary package, within the outer package, when the outer package is provided around the inner package and the primary package.

In an embodiment, the method further comprises forming the inner package in a thermal form process by using the primary package as a thermal forming mold. In an embodiment, the primary package includes perforations that cause the inner package to be drawn on the primary package during the thermal form process.

In an embodiment, the method further comprises providing a vent on the outer package, the vent configured to allow air to pass between an outside of the outer package and an inside of the outer package. In an embodiment, the tape includes a vent that is configured to allow air to pass between an outside of the outer package and an inside of the outer package.

In an embodiment, the inner package includes a body, configured to surround a part of the primary package, and a flange extending from the body of the inner package, the outer package includes a first body of the two bodies, configured to surround a part of the inner package, and a flange extending from the first body of the outer package, and the providing the outer package around the inner package comprises contacting the flange of the outer package with the flange of the inner package.

In an embodiment, the two bodies of the outer package are separated from each other by a gap of air when the tape seals the two bodies of the outer package together.

In some embodiments, a non-transitory computer-readable medium storing instructions is provided. The instructions, when executed by at least one processor, cause the at least one processor to control a system comprising one or more actuators to: form a package that includes a primary package, an inner package configured to surround the primary package, an outer package including two bodies that are configured to surround opposite sides of the inner package, respectively, wherein the instructions are configured to cause the at least one processor to control the system to provide the outer package and the inner package around the primary package such that the outer package is provided around the inner package and the primary package, and an air gap is formed between the inner package and the outer package.

DESCRIPTION OF DRAWINGS

A brief description of some representative drawings is provided as follows.

FIG. 9A illustrates a rear view of a tape of an embodiment.

FIG. 9B illustrates a side view of the tape of the embodiment.

FIG. 9C illustrates a front view of a portion of the tape of the embodiment.

DESCRIPTION OF EMBODIMENTS

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

Any reference to claim elements in the singular, for example, using the articles "a," "an," "the" or "said," is not to be construed as limiting the element to the singular.

Custom Packaging

Figure 1:
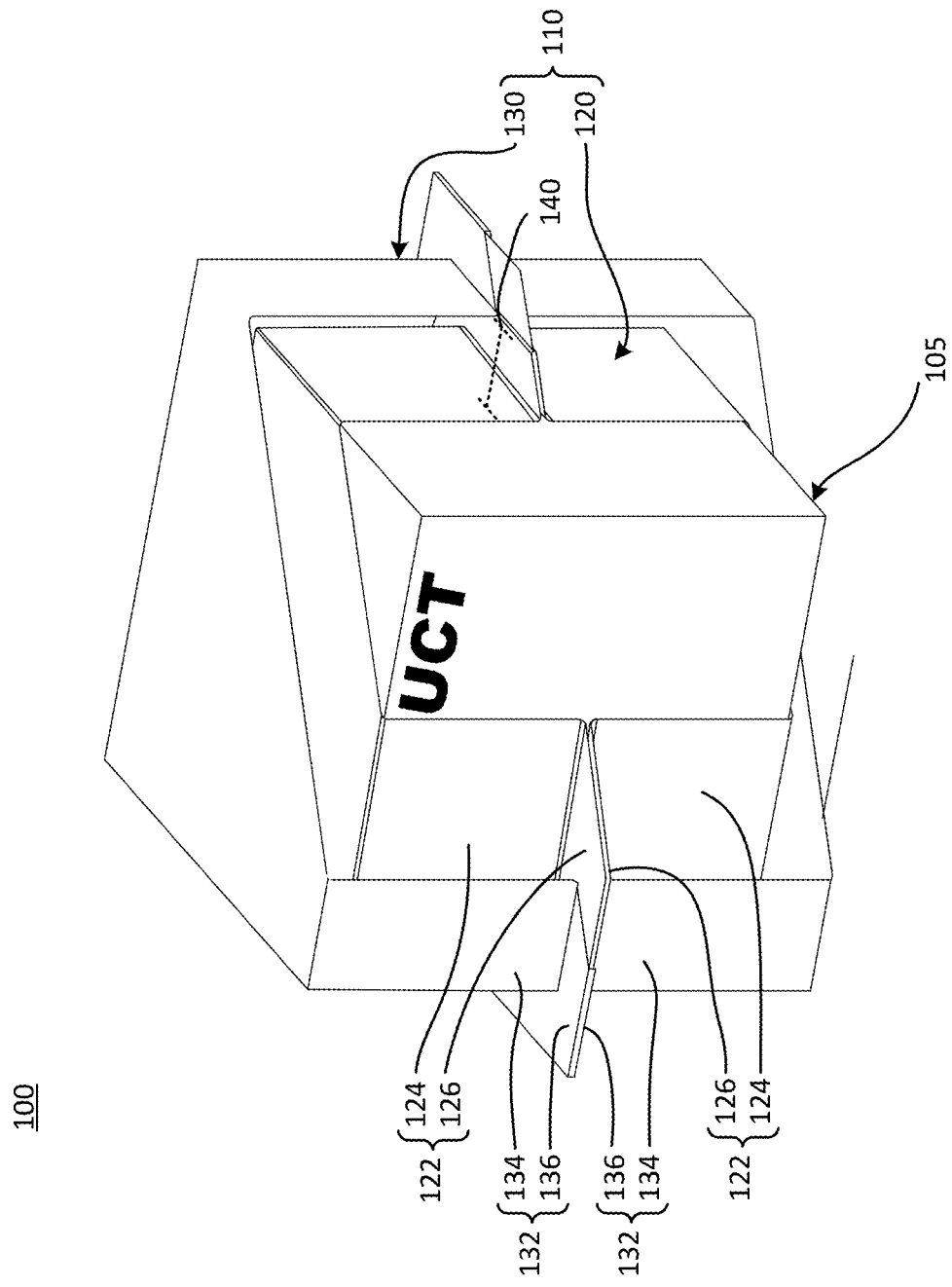
FIG. 1 illustrates a perspective, cut view of a custom packaging of the disclosure, before trimming.

FIG. 1 illustrates a non-limiting embodiment of a custom packaging 100 that may comprise a primary package 105, and a secondary package 110 including an inner package 120 and an outer package 130, wherein the inner package 120 and the outer package 130 may be formed of films, around the primary package 105. The films of the inner package 120 and the outer package 130 may be formed of, for example, plastic, or a composition of paper and plastic as the binder for allowing stretching and formation. The films may be made of material that is easily recyclable. Accordingly, users of the custom packaging 100 may use a simple grinder to easily reduce the custom packaging 100, at home, to a simple bag of grindings for ease of recycling.

Figure 2:
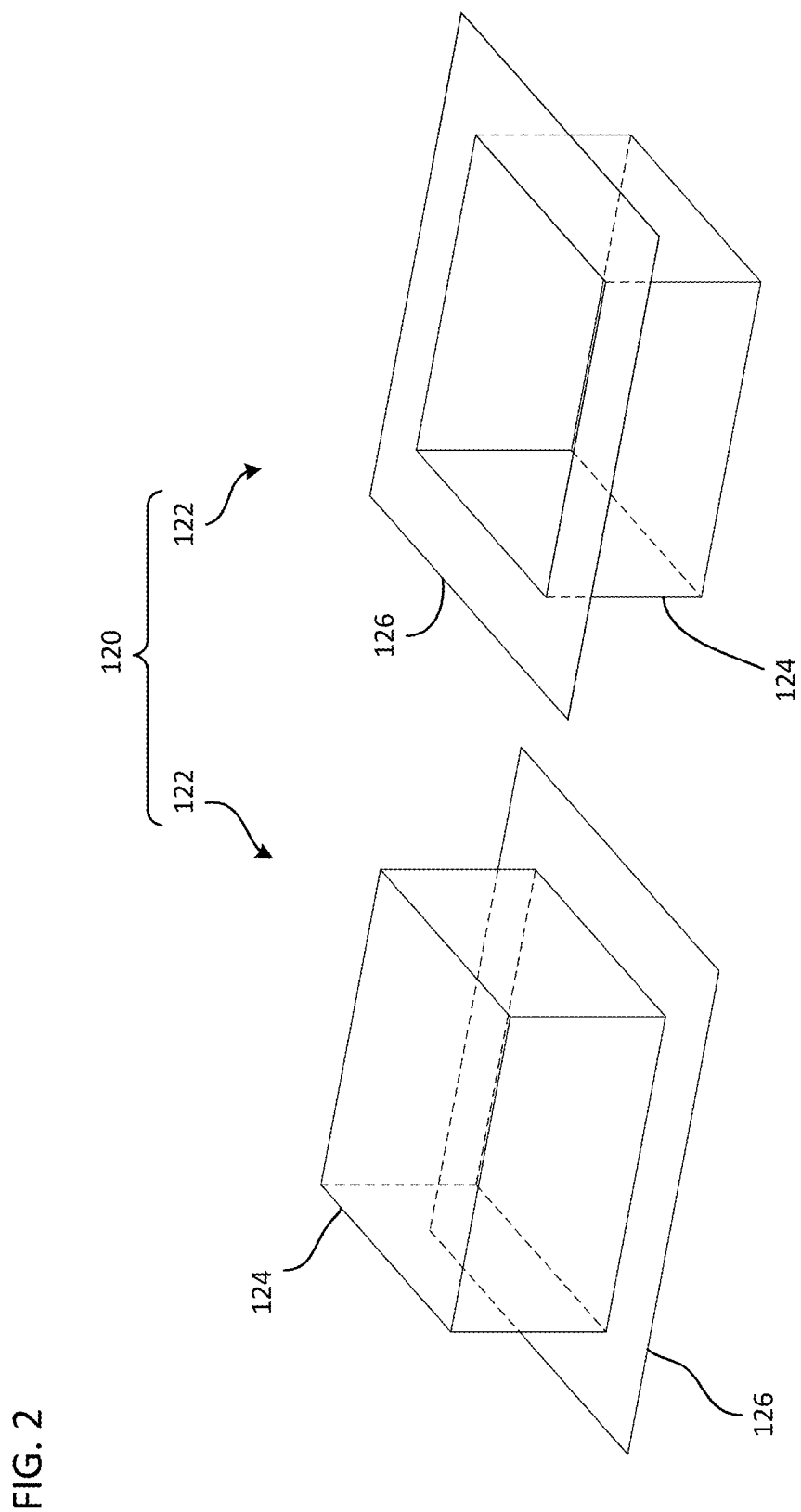
FIG. 2 illustrates a perspective view of an inner package of the disclosure.
Figure 3:
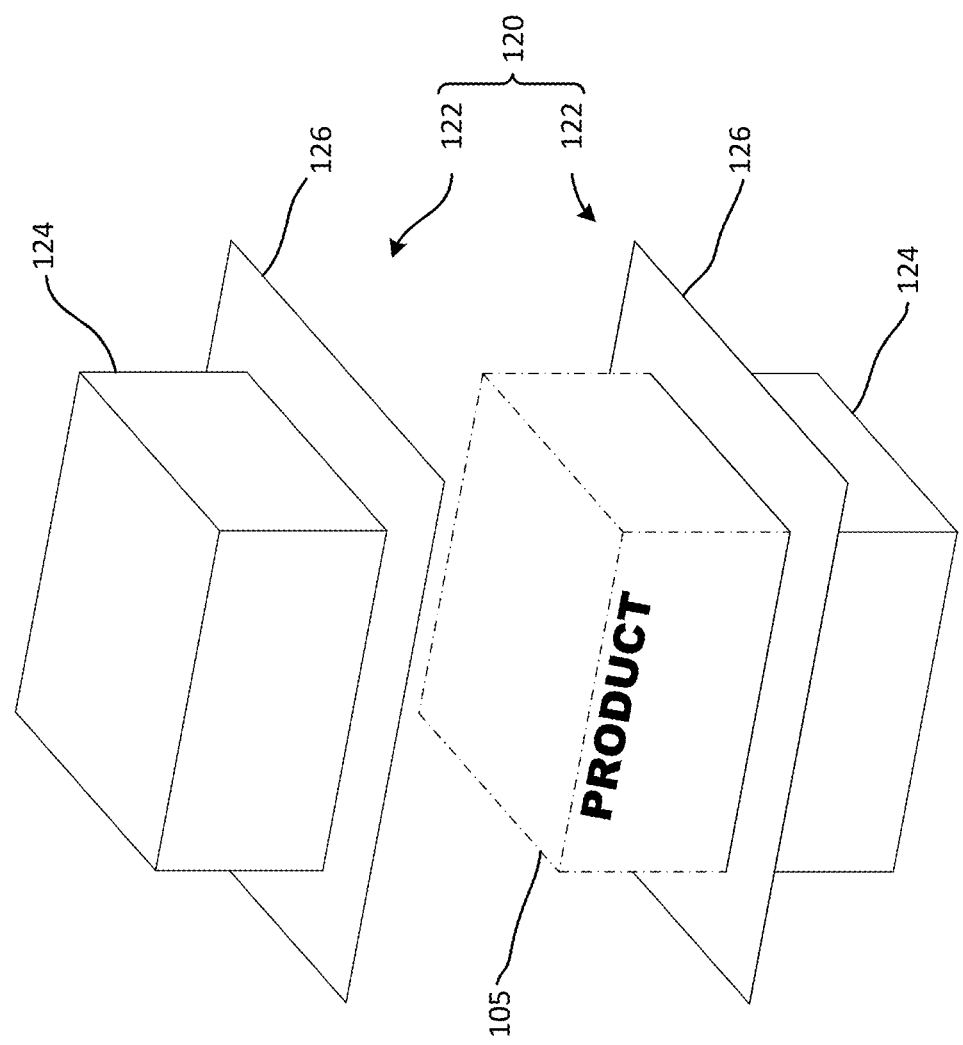
FIG. 3 illustrates a perspective view of the inner package being placed around a primary package.

As illustrated in FIG. 2, two protective pieces 122 of the inner package 120 may be formed. The two protective pieces 122 may then be provided around the primary package 105, as illustrated in FIG. 3, to allow air capture within the space between the protective pieces 122. For illustrative purposes, portions of the primary package 105 that are visible in the configuration illustrated in FIG. 3 are shown with dot-dash lines. The inner package 120 may be an inner liner that is used as an inner protective package of the custom packaging 100 for protecting the primary package 105. The protective pieces 122 of the inner package 120 may each include a body 124 and a flange 126, wherein the flange 126 extends away from the body 124.

Figure 4:
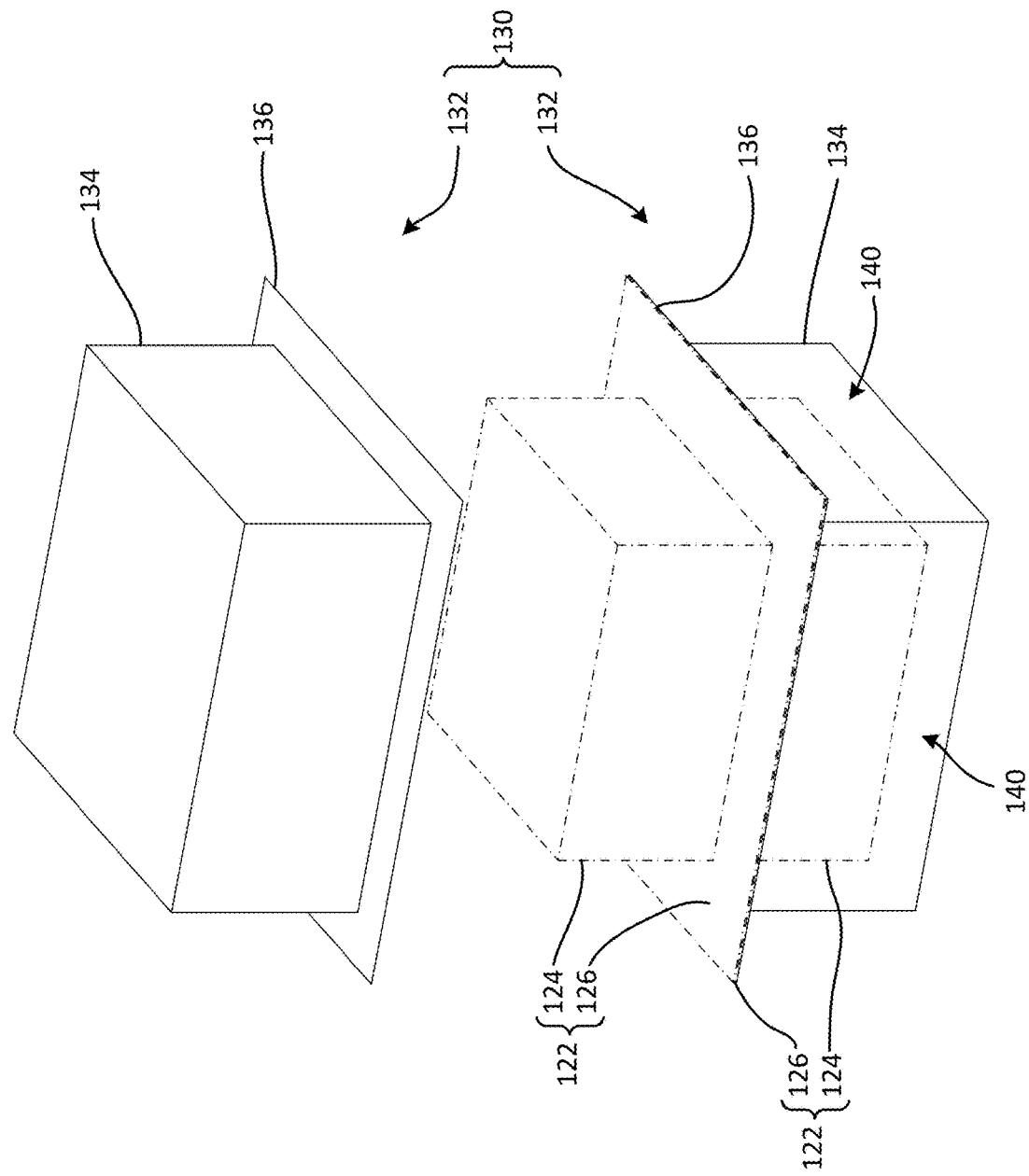
FIG. 4 illustrates a perspective view of an outer package being placed around the inner package and the primary package.

With reference to FIG. 1, a secondary package 110 may be formed to include an outer package 130 of the custom packaging 100 for protecting the primary package 105. The outer package 130 may be an outer liner including, for example, two protective pieces 132 to be used as outer protective pieces of the custom packaging 100. As illustrated in FIG. 4, the protective pieces 132 of the outer package 130 may each include a body 134 and a flange 136, wherein the flange 136 extends away from the body 134. For illustrative purposes, some portions of the inner package 120 that are both hidden and visible in the configuration illustrated in FIG. 4 are shown with dot-dash lines to distinguish from the outer package 130. As illustrated in FIG. 1, the flanges 136 of the protective pieces 132 of the outer package 130 may be configured to overlap the flanges 126 of the protective pieces 122 of the inner package 120. Also, the outer package 130 may be spaced away from the inner package 120, when used in the custom packaging 100, such that an air gap 140 is provided between the bodies 134 of the outer package 130 and the bodies 124 of the inner package 120. The air gap 140 may function as a protective cushion that protects the primary package 105. The flanges 126 of the inner package 120 may be sandwiched between the two protective pieces 132 of the outer package 130, thereby causing the inner package 120 and the primary package 105 to be suspended within the outer package 130. Accordingly, the air gap 140 may surround the inner package 120 and provide a protective cushion on all sides of the primary package 105. The flanges 136 may be designed with small airways to allow a small amount of air movement under pressure.

The protective pieces 122 of the inner package 120 or the protection pieces 132 of the outer package 130 may be formed of a colored film that obscures the primary package 105 from sight. For example, the inner package 120 may be clear or semi clear and the secondary package 110 may be, for example, black. To obscure the primary package 105 from sight, at least one of the inner package 120 and the outer package 130 may be opaque by including, for example, a dark color.

Figure 5:
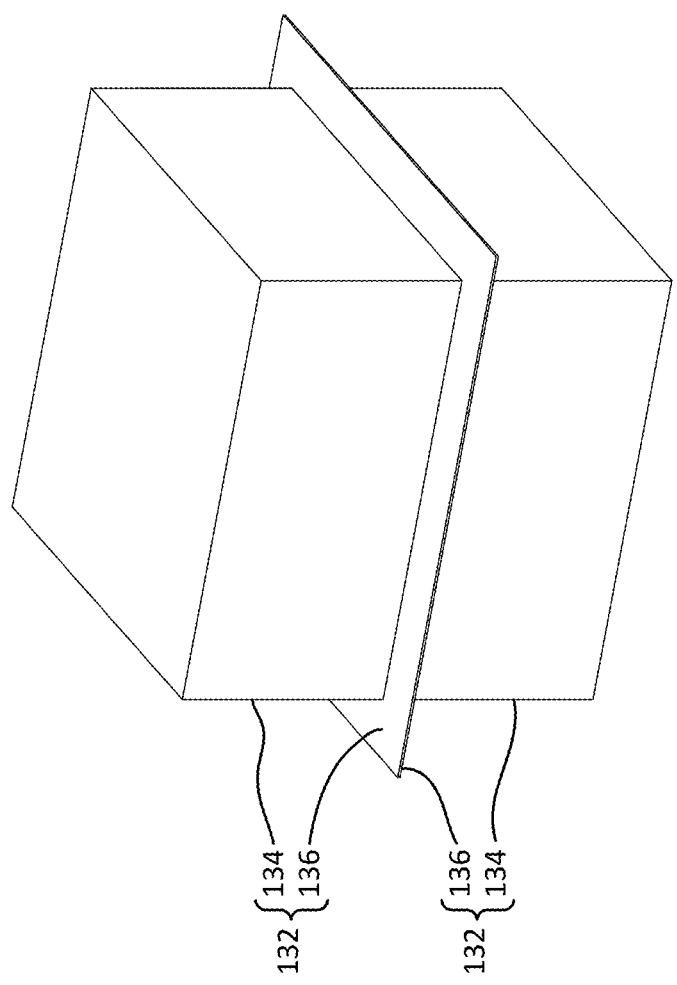
FIG. 5 illustrates a perspective view of the outer package placed around the inner package and the primary package before trimming.

After providing the inner package 120 around the primary package 105, the protective pieces 132 of the outer package 130 may be secured around the inner package 120 and the primary package 105 as illustrated in FIG. 5. The inner package 120 and the outer package 130 may be trimmed while secured around the primary package 105, or they can be pre trimmed as needed. FIG. 6A illustrates an example of a trimmed version of the custom packaging 100.

Figure 6B:
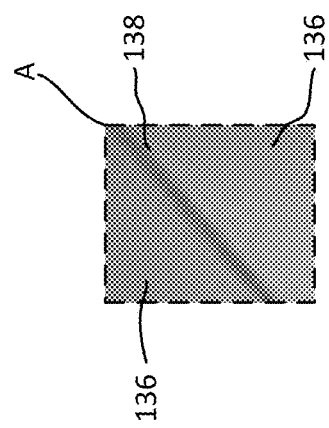
FIG. 6B illustrates an enlarged view of a gap within the custom packaging of FIG. 6A.
Figure 6A:
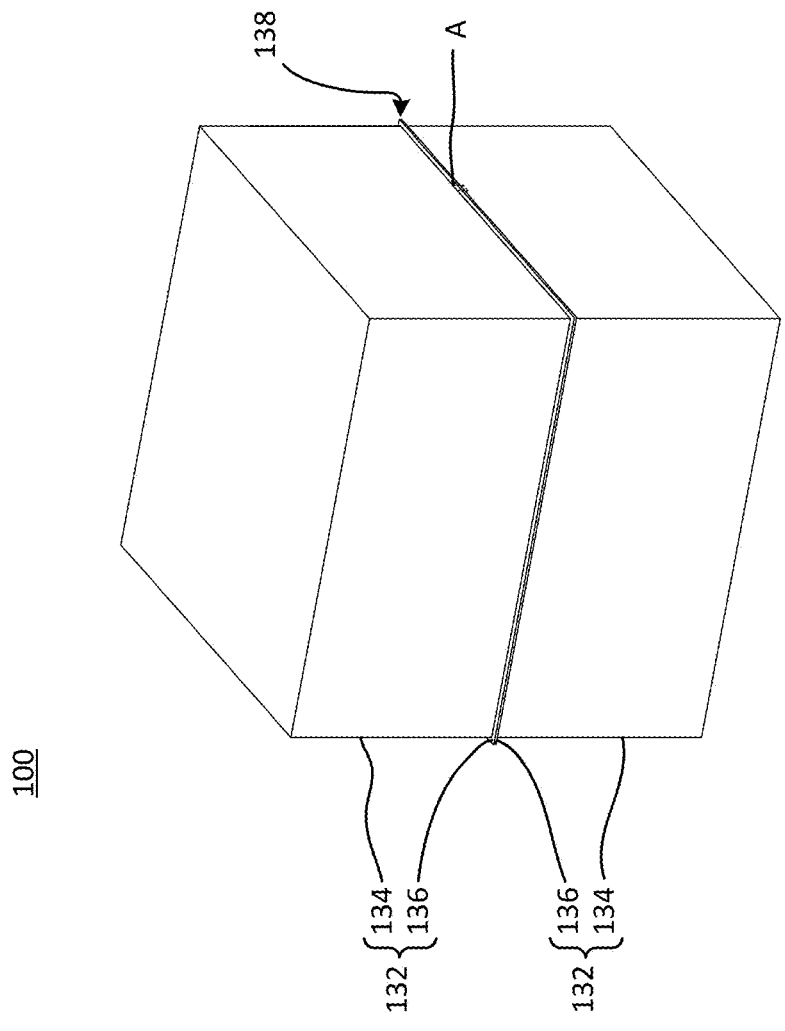
FIG. 6A illustrates a perspective view of an assembled custom packaging after trimming.

As illustrated in FIG. 6B, the custom packaging 100 may optionally include an air gap 138 between the two halves of the outer package 130. The air gap 138 may be included with the custom packaging 100, depending on a type of seal used with the custom packaging 100.

After trimming of the custom packaging 100 and while the inner package 120 and the outer package 130 are provided around the primary package 105, tape may be applied around the outer package 130 to seal the custom packaging 100.

Figure 7:
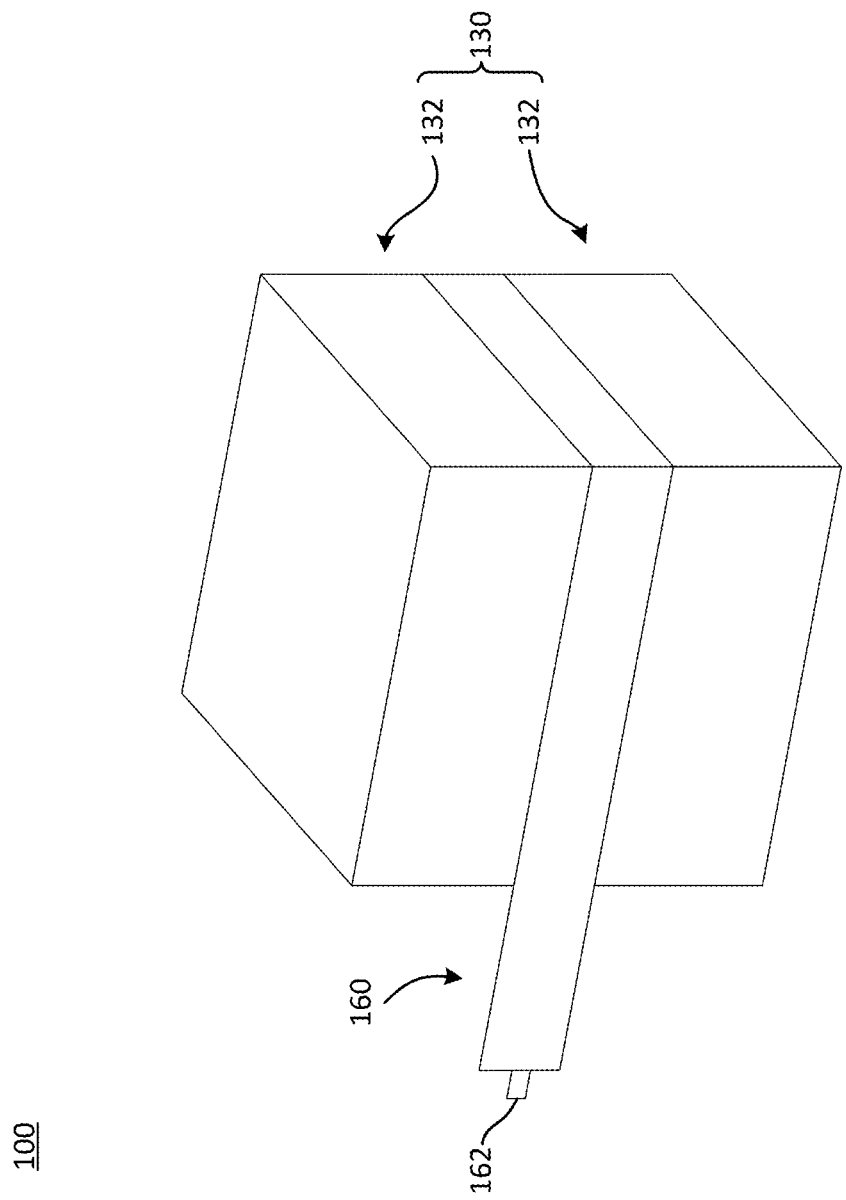
FIG. 7 illustrates a perspective view of the assembled custom packaging after trimming, and a taping process of the custom packaging.
Figure 8:
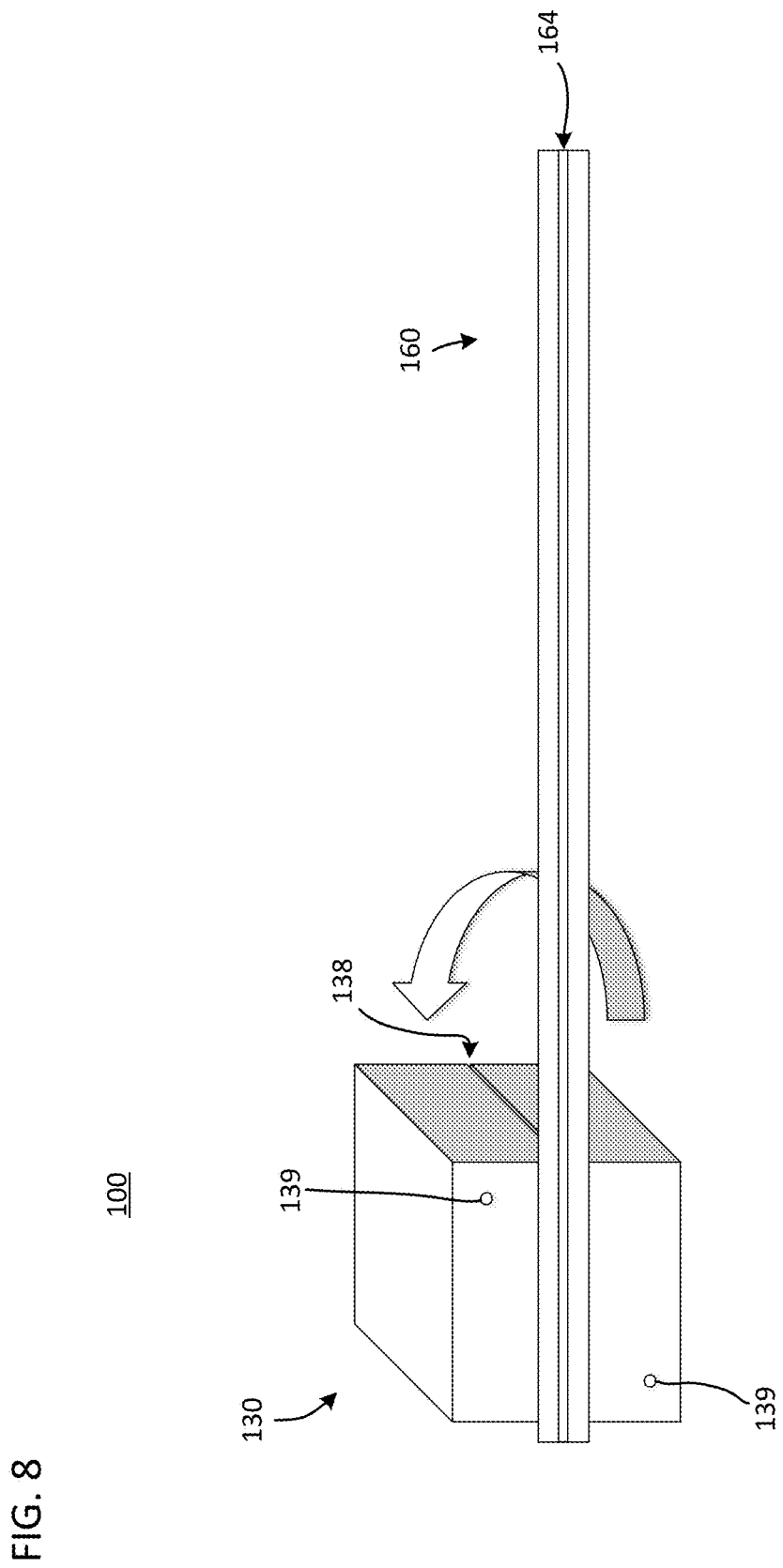
FIG. 8 illustrates a perspective view of an assembled custom packaging after trimming and during a taping process of the custom packaging with a tape.

For example, as illustrated in FIG. 7, the tape 160 may be included with a strip 162 to provide a means to open the custom packaging 100. The strip 162 may be, for example, a plastic strip, and may be configured to separate the tape into two pieces when pulled, allowing the package to be easily opened. The construction of the tape 160 may be designed to allow the strip 162 to be discovered by the user to open the custom packaging 100. The strip 162 may be stronger than the force required to separate the tape 160 from the outer package 130. As illustrated in FIG. 8, the tape 160 may alternatively or additionally include a strip 164 designed to be a thinner area at a center of the tape 160, in the width direction of the tape 160. The tape 160, when applied to the outer package 130, may allow an adhesive seal across the seam or gap 138 between the two halves of the outer package 130. In embodiments, the tape 160 may include both the strip 162 and strip 164 such that the strip 162, when pulled, pulls the strip 164. In embodiments, the strip 162 and strip 164 may be integrated together as a single strip.

FIG. 8 illustrates the tape 160 being applied to the outer package 130, the tape including the strip 164 for separating the tape 160 from the outer package 130 when pulled. As further shown in FIG. 8, the outer package 130 may include pressure vents 139 for atmospheric adjustments. That is, for example, when pressure is above a preset threshold, the air moves through the pressure vents 139 such that a pressure difference between the inside and the outside of the custom packaging 100 is decreased. Pressure vents 139 may be selected and designed for the deformation limit of internal pressure allowing vacuum and the pressures to move air as needed without causing deformation to the custom packaging 100. For example, a pressure vent 139 with a specific size and area can allow a specified amount of air to escape over specific pressures and may be designed to maintain strength but limit deformation of the custom packaging 100. These types of pressure vents may be used to prevent chemical packaging from crushing and expanding a package, while allowing for specific pressures during transportation. Also, such pressure vents may assure a specific strength of the atmospheric internal pressures to maintain the shape of the custom packaging 100. The tape 160 may also include a small gap to allow two halves of the tape 160 to be joined without gluing them together.

FIGS. 9A-B illustrate a rear and side view of a tape 170 that may be used as an alternative to tape 160 with the custom packaging 100. FIG. 9C illustrates a front view of a portion of the tape 170.

As illustrated in FIGS. 9A-B, the back side of the tape 170 may include a base 172 as a base of the tape 170. As illustrated in FIGS. 9B-C, a strip 174 may be provided at a front side of the base 172 so as to extend along a longitudinal axis of the tape 170. The strip 174 may have a same configuration as the strip 164, illustrated in FIG. 8, and may also include the strip 162 illustrated in FIG. 7. Additionally, an adhesive 176 may be provided on the base 172 and the strip 174 to form a front side of the tape 170 that may adhere to the custom packaging 100. The tape 170 may include an atmospheric vent 178, as discussed later in the present disclosure, that is designed to slowly allow exchange of air as needed for altitude and crush events. The atmospheric vent 178 may be provided through the strip 172, between portions of the adhesive 176 where the base 172 is exposed at a front side of the tape 170. The tape 170 or custom packaging 100 may be rotated as needed so that the tape 170, via the adhesive 176, is applied around the outer package 130 about a seam, defining the gap 138 between the protective pieces 132 of the outer package 130. Accordingly, for example, air may be exchanged through the atmospheric vent 178 of the tape 170 and the air gap 138 of the custom packaging 100.

To allow air to enter and exit the custom packaging 100, at least one vent (e.g. pressure vent 139 or atmospheric vent 178) may be included in the outer package 130 or the tape 170 as a pressure vent. The vent may be heat sealed on the outer package 130 or the tape 170, and be configured to allow air to move slowly and prevent moisture from entering the custom packaging 100. The size of the vent may be designed based on the air volume of the air gap 140, acting as the protective cushion, defined between the inner package 120 and the outer package 130. The vent may allow expansion and contraction with altitude and crush events. The vent may be sized to restrict air from moving rapidly and to allow the custom packaging 100 to hold its base shape for hours when being crushed dramatically. This feature allows the custom packaging 100 to allow for volume compensation over time during altitude events.

Figure 10:
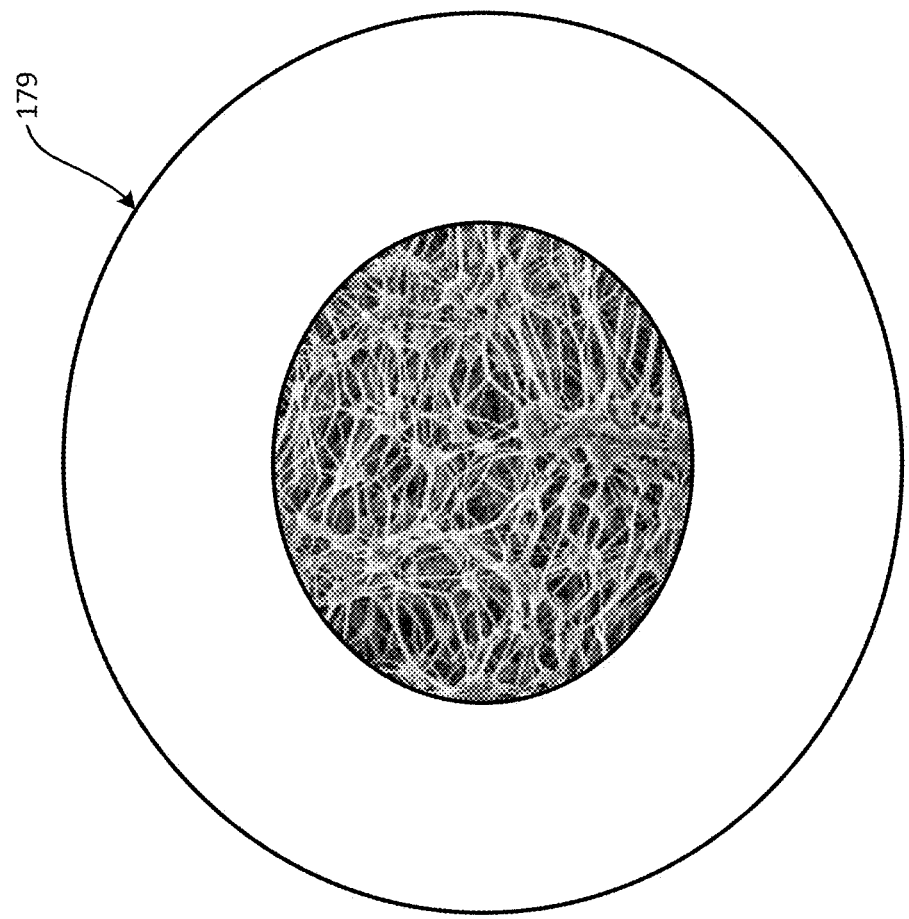
FIG. 10 illustrates a vent for air of an embodiment that is restricted for a specific pressure to assure altitude resistance, crush resistance, and compatibility.

The vent may be, for example, a heat sealed Gortex vent. Using a material like Gortex allows air to move but limit moisture from entering the package. The vent may comprise a hole in the substrate combined with a portion of Gortex-like membrane. The two may be sealed together with a controlled orifice to limit air flow and may be designed for specific pressure limits. The two may be sealed together with the controlled orifice using the film of the outer package 130 or the tape 170 as the framing layer. Also, as illustrated in FIG. 10, the tape 170 may include one or more small ribs 179 as the atmospheric vent 178 that vent to the atmosphere, such that the pressure vents allow flowing air to and from the custom packaging 100. The ribs 179 may be waterproof and restricted for a specific pressure to assure altitude resistance, crush resistance, and compatibility.

Figure 11:
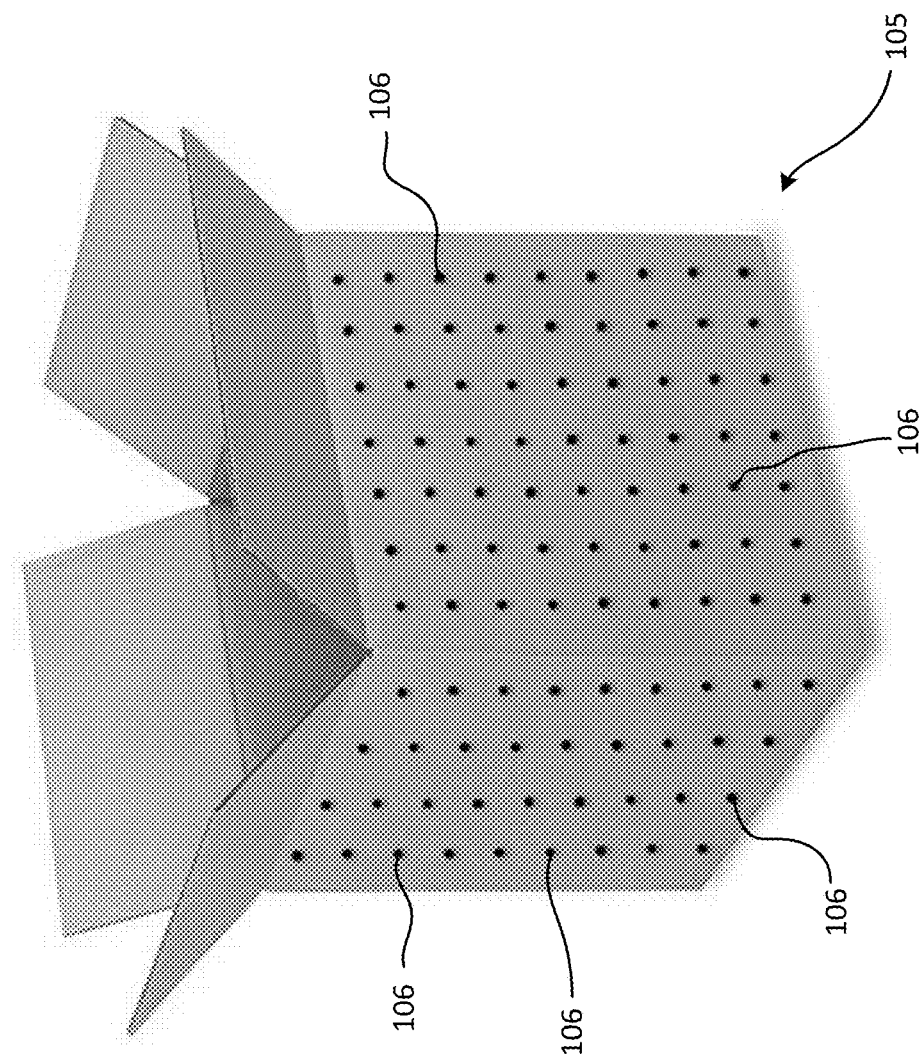
FIG. 11 illustrates a primary package of an embodiment that may be used as a thermal forming mold.

The inner package 120 can also be thermally formed over the primary package 105, thus avoiding the need for molds and forms. For example, the primary package 105 may include perforations 106, as shown in FIG. 11, enabling the perforated primary package 105 to be used as a thermoform itself. It is possible to perforate existing primary packages as well with a simple roller system. Accordingly, a vacuum may be drawn through the primary package 105 allowing a film of an inner package 120 to be drawn down onto the primary package 105.

Figure 12:
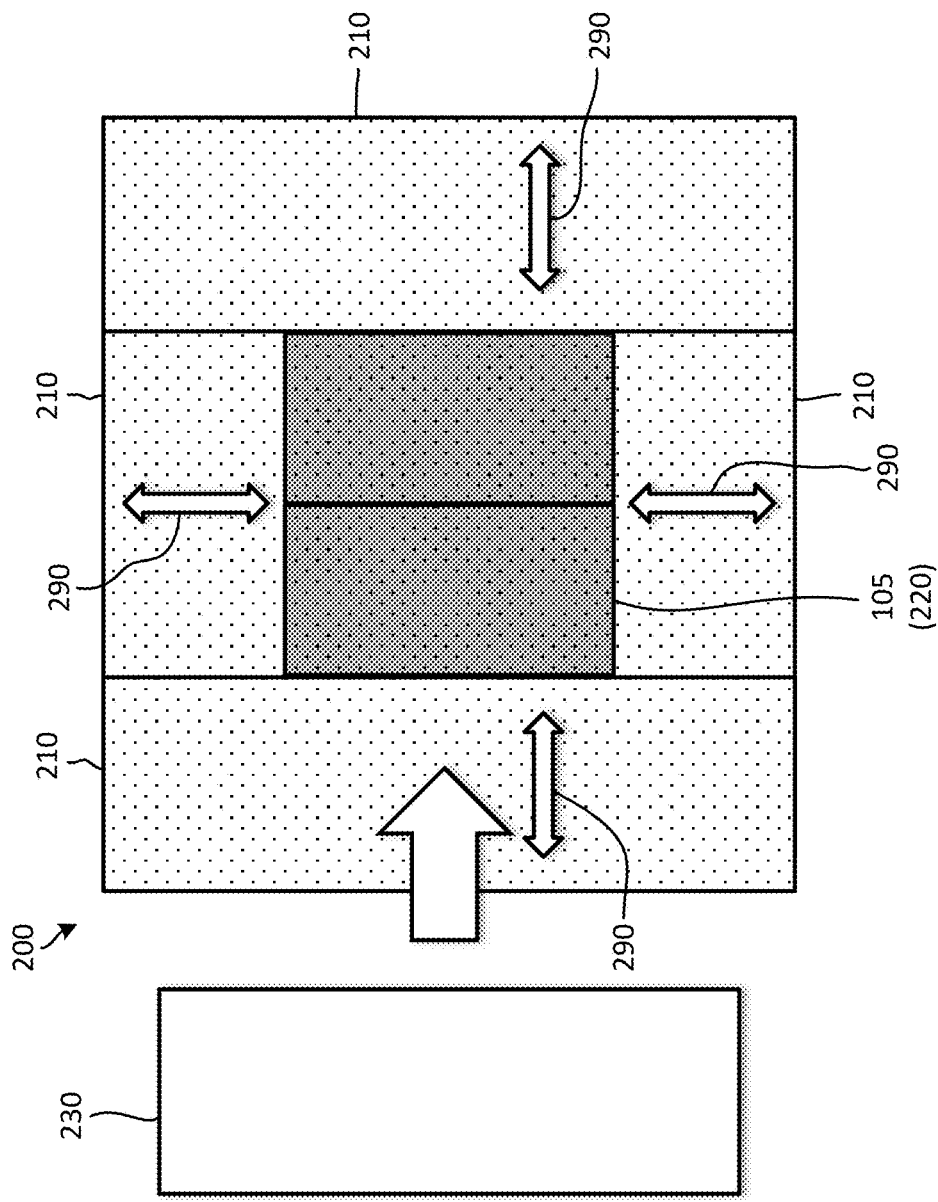
FIG. 12 illustrates an adjustable vacuum table of an embodiment for thermal forming.

The adjustable vacuum table 200, as illustrated in FIG. 12, allows a lower portion of the primary package 105 to be under vacuum and an upper portion to be used for the forming process. The film from a roll 230 is drawn past the primary package 105 and placed against the table 200 and the film is drawn down forming at least one protective piece 122 of the inner package 120.

The adjustable vacuum table 200 for thermal forming may include blades 210, that are perforated sliding metal sheets constructed as a table, with an aperture 220 there between. The blades 210 may be slid in the directions 290 to adjust the size of the aperture 220. In an embodiment, the blades 210 may include rubber end seals to seal against the primary package 105 to allow the adjustable vacuum table 200 to draw the film down to form at least one protective piece 122 of the inner package 120. The adjustable vacuum table 200 can be preset to thermal form a half or full inner package 120.

The adjustable vacuum table 200 may further include a second table that supports the primary package 105, measures the height of the primary package 105, and then lowers to a preset distance below the plane of the aperture 220 of the table of blades 210. The blades 210 may then decrease the size of the aperture 220 and close around the primary package 105. A vacuum may draw under the sliding blade aperture 220 to draw the film over the primary package 105.

The adjustable vacuum table 200 may also set cutting process distances for a rough or final cut of the inner package 120 and/or outer package 130 as needed. The intersection of the blades 210 with the primary package 105 may indicate a cutting zone that can be easily calculated by position and intersections of the blades 210. The cutting parameters may then be saved in a computer comprising a processor and memory for initiating cutting. A user may adjust an offset for robotic cutting or shears that are automatically initiated using the parameters preset through calculation.

In view of the above, the primary package 105, that may be for example a corrugated or chip board, may be designed to be used as a thermal forming mold, thereby allowing a vacuum to be pulled through the primary package 105 and allowing the film of the roll 230 to be pulled over the primary package 105 to form an inner package 120 of a secondary package 110. The primary package 105 used with the adjustable vacuum table 200 may be the primary package 105 that is included in the custom packaging 100, or may be a box that is of a similar size to the primary package 105 that is included in the custom packaging 100.

Automated Manufacturing of Custom Packaging 100

The custom packaging may be manufactured as, for example, provided below.

In an embodiment, once a distribution system has selected a product to be shipped, the system may load the product and package parameters into a queue. Understanding the process time, the system may sequence and schedule fabrication of a secondary package to match the conveyor timing. As components of the custom packaging, including the product and the secondary package, move down the conveyer, the components may be visually assured for sequence and alignment in time. When the components of the custom packaging meet up, the custom packaging may be assembled and then visually confirmed again. The custom packaging may then be taped and confirmed for shipping.

In an embodiment, once a product is identified, the halves of the inner package and the outer package of the secondary package may be selected based on dimensions, and the on-line production of a secondary package may be set up. Also, the primary package itself may be used as part of the tooling for the custom packaging.

Figure 13:
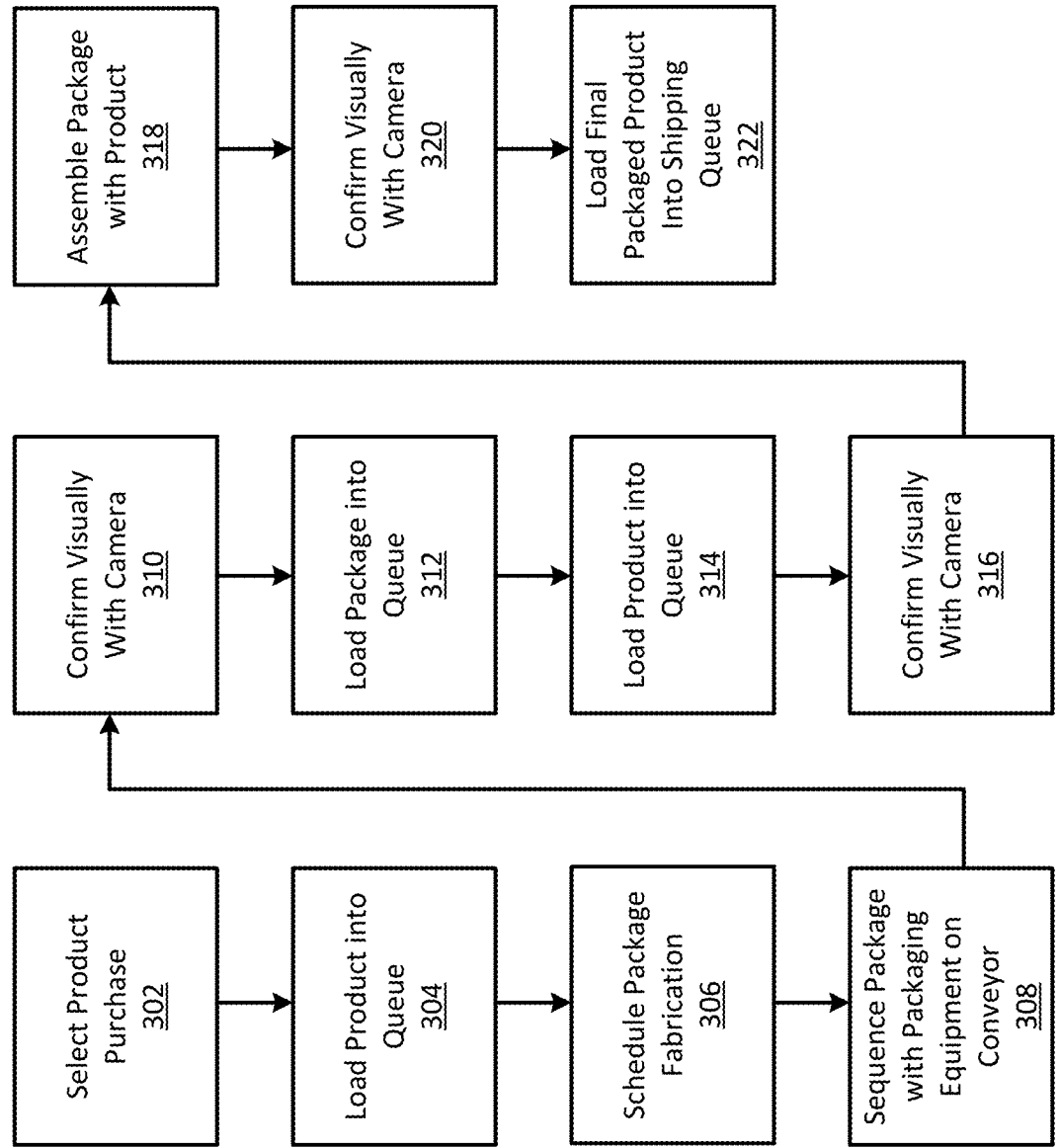
FIG. 13 is a block diagram illustrating a process of sequencing of packaging in a production environment for a manufacturing embodiment.

FIG. 13 illustrates a process 300 of sequencing of packaging in a production environment for a manufacturing embodiment. The process 300 may be performed by a controller of a manufacturing system, comprising at least one processor with memory including computer instructions that is configured to cause the at least one processor to perform the method 300.

As an example, the process 300 may be performed by an automated inline packaging machine, comprising the at least one processor with the memory, that is designed to align packaging production with products to be packaged.

In an embodiment, the process 300 may be as follows. A product may be selected as purchased by a user (302). For example, the product may be selected as purchased by a user, such as purchasing user or a manufacturing controller, via an input device of a user terminal. Following, the product may be loaded into a queue for packaging (304), and scheduled for package fabrication (306) by using, for example, the at least one processor. For example, the product may be physically loaded in a queue and/or information of the product may be loaded into a queue. The at least one processor may cause packaging to be sequenced with the proper packaging equipment (308), form the packaging in some cases, and visually confirm the size, shape, and sequence of the package using a camera(s) (310). Such packaging may be, for example, at least one from among a primary package 105 and components of a secondary package 110 (e.g. components of the inner package 120 or the outer package 130), including thermal formable packaging to be formed with a thermal form mold. The at least one processor may then load information or physically load the product and the secondary package 110 into a queue for the secondary package 110 and the product to meet up properly in the process for fabrication (312 and 314). During this time, the primary package 105 may also be caused to meet up with the product by loading the primary package 105 and/or information of the primary package 105 in the queue. The at least one processor, via a same or another camera(s) may visually confirm that the product, the primary package 105, and the components of the secondary package 110 will meet up (316). Following, the secondary package 110 may be sequenced and assembled to the product to form the custom packaging 100 (318). The primary package 105 may also be assembled to the product when forming the custom packaging 100, or at any previous time. For example, the primary package 105 may already be provided with the product when the product is initially loaded into the queue (304) after product purchase selection (302).

The sequence for assembling (318) may be as illustrated in FIGS. 2-6, which, together, shows progressive sequencing of parts to form the custom packaging 100. The sequence may also include, for example, thermal form molding or other packaging sequences indicated within this disclosure. Also, a packaging machine may use different sequences for forming different custom packages 100. During the assembly (318), the custom packaging 100 may be trimmed and taped with a specialized tape (e.g. tape 160 or tape 170). Following, the at least one processor, via the same or different at least one camera, may visually confirm the assembly is correct (320). The custom packaging 100 may then proceed to the final stage for shipping of bulk packaging (322).

Figure 14:
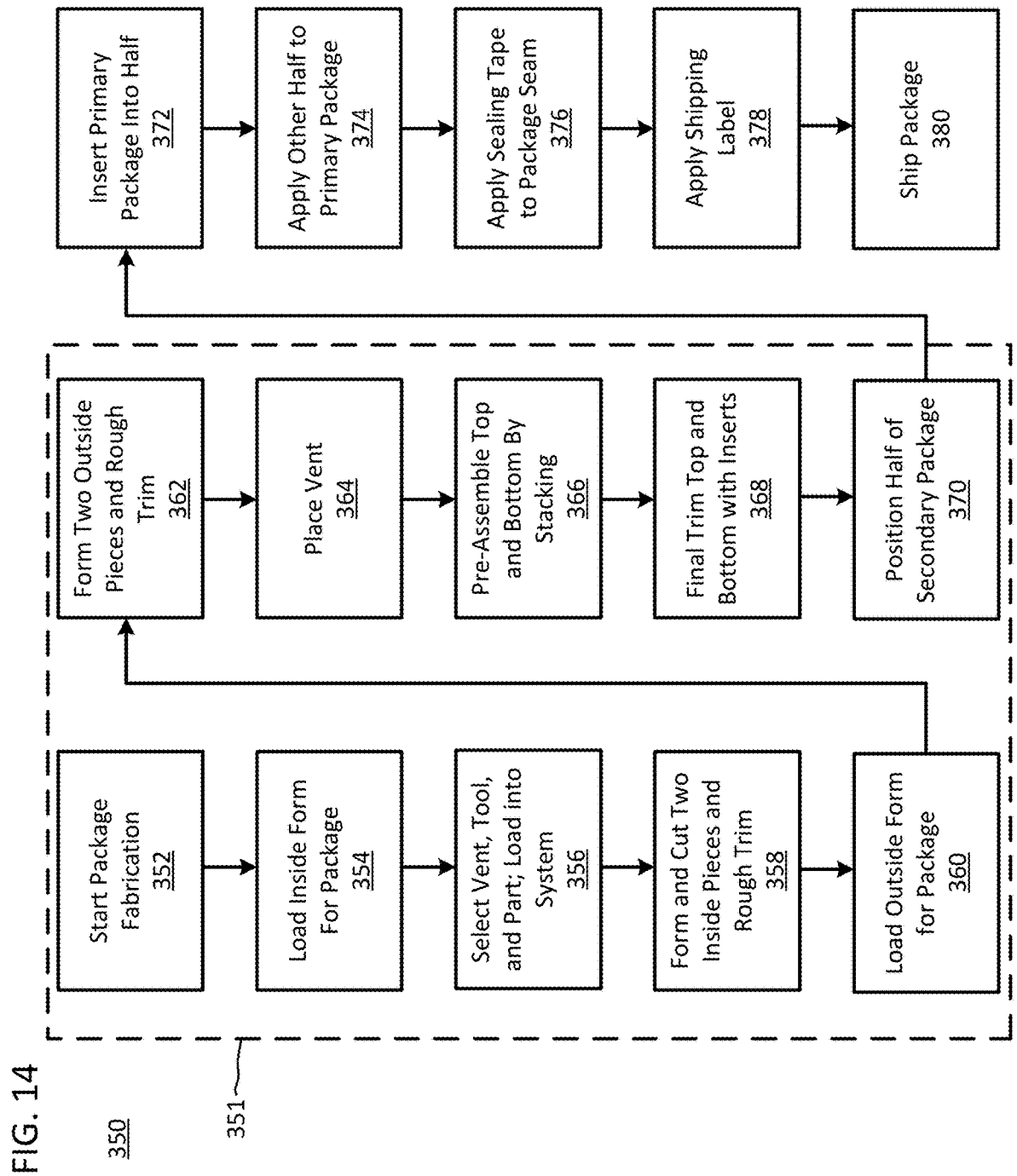
FIG. 14 is a block diagram illustrating a process of manufacturing a custom packaging of an embodiment.

FIG. 14 illustrates a process 350 where the inner package 120 and the outer package 130 are formed with at least one thermal form mold and the machine aligns the inner package 120 and the outer package 130 to form the secondary package 110. The process 350 may be performed by a machine that includes at least one processor with memory including computer instructions that is configured to cause the at least one processor to control the machine to perform the method 350.

In an embodiment, the process 350 may include a package fabrication and staging process 351. For example, once a package fabrication process is started (352), the machine may load inside forms to be used as thermal form molds for the secondary package 110 (354). A vent (e.g. pressure vent 139), tool, and part may be selected for the specific secondary package 110 and loaded into the machine (356). The machine may then thermal form and cut two inside pieces to form the protective pieces 122 of the inner package 120 (358). The machine may then load outside forms (360) and thermal form and cut two inside pieces to form the protective pieces 132 of the outer package 130 (362). The vent (e.g. pressure vent 139) may also be placed on any of the protective pieces 132 of the outer package 130 (364). For example, the vent may be heat sealed over a hole in a protective piece 132. The protective pieces 132 of the outer package 130 may then be assembled around the protective pieces 122 of the inner package 120, respectively (366), and the inner package 120 and the outer package 130 may be trimmed (368). In some cases, the vent (e.g. pressure vent 139) may be placed on any of the upper and lower secondary package 110 assemblies, after being assembled. Following, one of the pre-assembled halves of the inner package 120 and the outer package 130 may be positioned for packaging the primary package 105 (370).

Following, the one pre-assembled half may be assembled to the primary package 105 (372). Afterwards, the other of the pre-assembled halves of the inner package 120 and the outer package 130 may assembled to the primary package 105 (374). Alternatively, the inner package 120 may be assembled to the primary package 105, and then the outer package 130 may be assembled to the inner package 120. After, the secondary package 110 is assembled to the primary package 105, the assembled package may then be taped along the seam of the package with a specialty tape (e.g. tape 160 or tape 170) to fully assemble the custom packaging 100 (376). Following, a shipping label may be applied (378) and the custom packaging 100 may be shipped (380).

Figure 15:
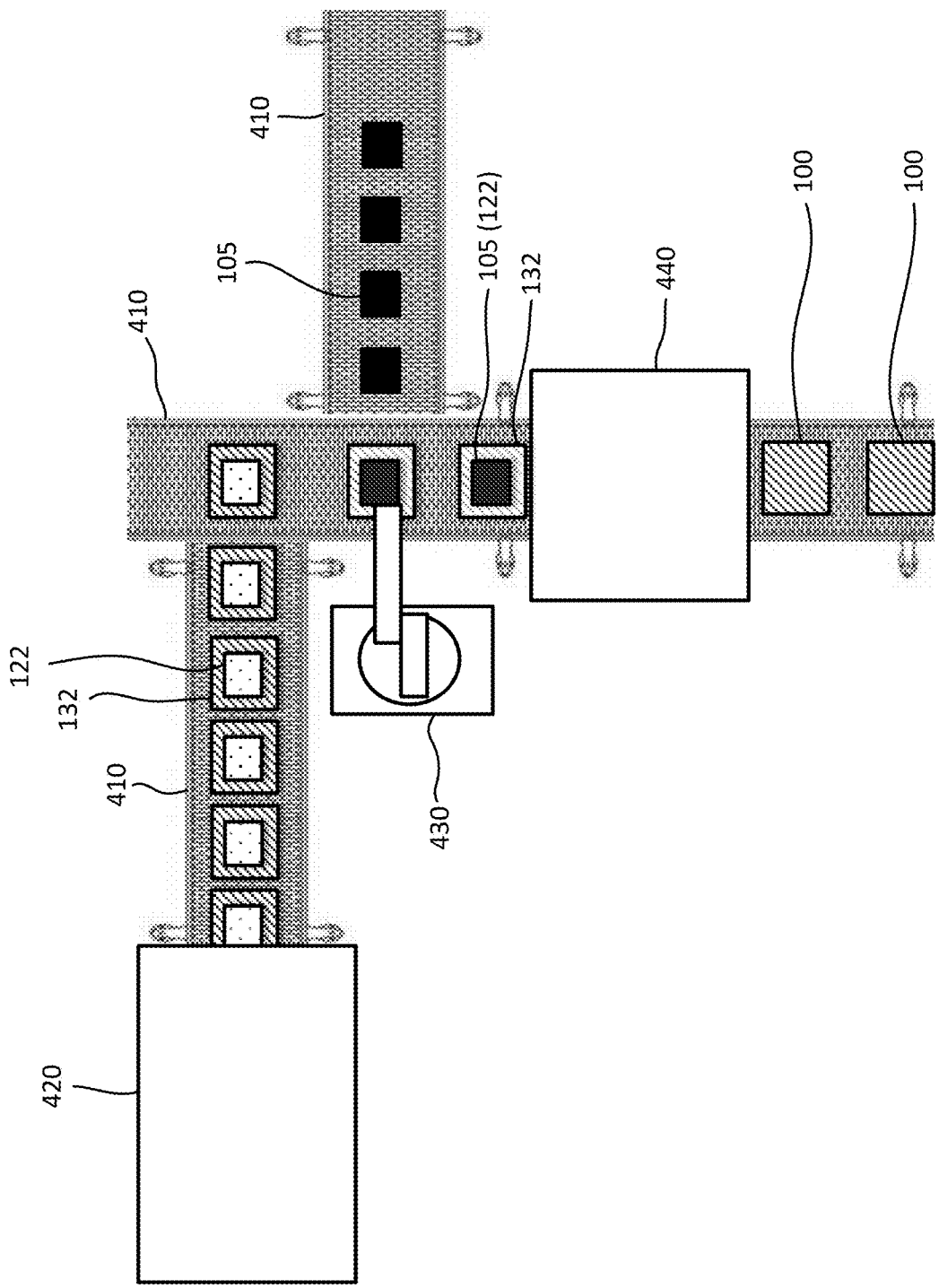
FIG. 15 is a diagram of a production line system of an embodiment.

With reference to FIG. 15, a production line system 400 is described. The below description of the system 400 is described with reference to a custom packaging 100 such as, for example, illustrated in FIG. 1.

FIG. 15 illustrates a production line system 400 where protective pieces 122 of the inner package 120 and the protective pieces 132 of the outer package 130 are formed by a thermal form system 420 and are assembled together, before a primary package 105 that includes the product is assembled to the halves. In other words, halves of the secondary package 110 are formed. Following, the halves of the secondary package 110 may be move by a conveyor 410 and a robot 430 may assemble the primary package 105 having the product into a first half of the secondary package 110 (e.g. one protective piece 122 and one protective piece 132) and place a second half of the secondary package 110 (e.g. another protective piece 122 and another protective piece 132) over the product. Next, the assembled package 100 may be trimmed and taped to form the custom packaging 100 for distribution, shipping or bulk packaging. For example, the device 440 may comprise, for example, at least one actuator, blade, and roll of tape to perform the trimming and taping. In an embodiments, the production line system 400 may be configured to perform the process 300 and the process 350.

Figure 16:
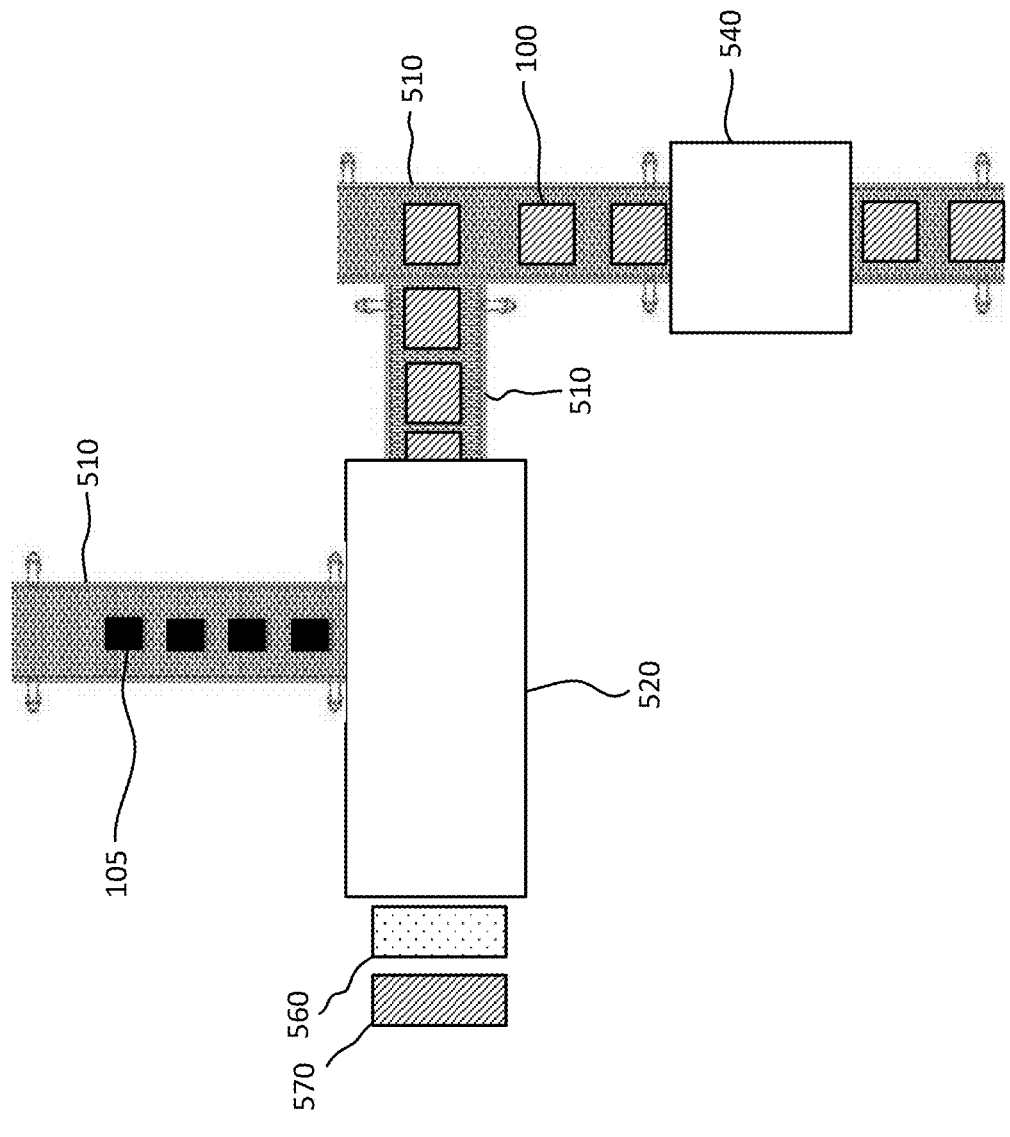
FIG. 16 is a diagram of a production line system of an embodiment.

FIG. 16 illustrates a production line system 500 that performs automated packaging on a product line. The below description of the system 500 is described with reference to a custom packaging 100 such as, for example, illustrated in FIG. 1.

The system 500 includes an in-line package fabricator 520 that is a device that uses the primary package 105 as a thermal form to make the secondary package 110, a device that uses separate forms to make the secondary package 110, or a device to that uses separate forms to make the primary package 105 and the secondary package 110. The in-line package fabricator 520 can be configured as any of the devices using different controls and equipment. The in-line package fabricator 520 may comprise, for example, one or more thermoform devices that may include any number of molds, heaters, vacuums, etc. The in-line package fabricator 520 may receive the primary package 105, form the inner package 120 and the outer package 130 of the secondary package 110, and assemble the inner package 120 and the outer package 130 to the primary package 105 to form custom packaging 100. The in-line package fabricator 520 may include one or more actuators to assemble the custom packaging 100 components. Once the secondary package 110 is assembled to the primary package 105 so as to form the custom packaging 100, the custom packaging 100 may move on a conveyor 510 to a device 540 that causes trimming and taping of the custom packing 100. The device 540 may comprise, for example, at least one actuator, blade, and roll of tape to perform the trimming and taping.

FIG. 16 illustrates the primary packages 105 with the products moving into the in-line package fabricator 520 via the conveyor 510. In one embodiment, inner liner 560 is thermal formed to a primary package 105 in the fabricator 520 to form the inner package 120, and the fabricator 520 may fabricate an outer package 130 with an outer liner 570 and provide the outer package 130 with the primary package 105. Accordingly, the inner package 120 and the outer package 130 are assembled to complete the secondary package 110 with the primary package 105 having the product inside. The fabricator 520 may, alternatively, separately form the inner package 120 and the outer package 130 before providing both to the primary package 105. The vents (e.g. pressure vents 139) may be automated on a tape reel, within the fabricator 520, and heat-sealed into the upper and lower halves of the secondary package 110 to allow minimal air flow while preventing moisture intrusion. For example, when the custom packaging 100 dimensions are known and the weight of the custom packaging 100 is known, a vent can be heat sealed onto the tape in process at specific lengths for specific pressures. For example, one or two vents per a custom packaging 100 may be appropriate but the overall pressure may still be calculated for selecting the proper apertures for these vents. The fabricator 520 may have several heat seal heads with different size openings for the vent seal. In an embodiments, the inner liner 560 and the outer liner 570 may be, for example, plastic. In embodiments, the production line system 450 may be configured to perform the process 300 and the process 350.

Figure 17:
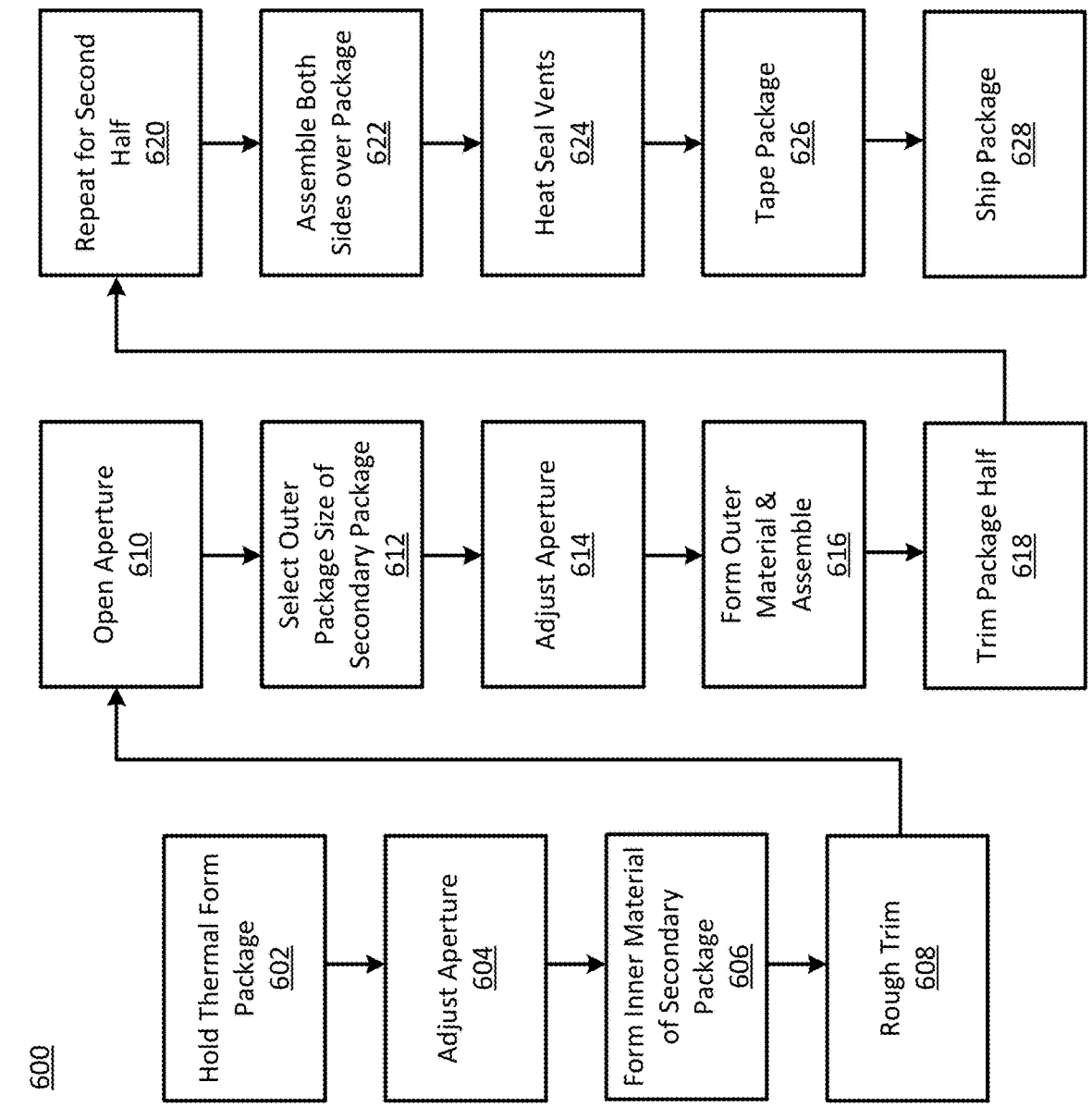
FIG. 17 is a block diagram of a variable thermal forming machine process of an embodiment.

FIG. 17 illustrates a process 600, performable by a machine, where a primary package 105 is designed to be a thermal form mold. As an example, the process 600 may be performed by the production line system 400 or the production line system 500.

With reference to FIG. 17, the machine may hold the primary package 105, as the thermal form package (602), and adjust an aperture (604). The machine may then form and assemble parts of the secondary package 110. For example, the machine may draw an inner liner film over the primary package 105 so as to form a half of the inner package 120 (606) and perform a rough trim of the half of the inner package 120 (608). The machine may then open the aperture (610), select a secondary size mold for an outer liner so as to select a size of the outer package 130 of the secondary package 110 (612), adjust the aperture (614), and mold (e.g. thermoform) the outer liner into a half of the outer package 130 and assemble together the half of the inner package 120 and the half of the outer package 130 (616). Following, the machine may perform a trim of the assembled half (618). The machine may then repeat the above process to form a second assembled half of the secondary package 100, comprising a second half of the inner package 120 and a second half of the outer package 130 (620). The machine may then assemble both halves of the secondary package 100 over a primary package 105 that contains a product so as to assemble the custom packaging 100 (622), apply heat seal vents to the secondary package 100 of the custom packaging 100 (624), and tape and trim the assembled custom packaging 100 (626). The assembled custom packaging 100 may then be shipped (628).

In the above process 600, instead of using the primary package 105 as a thermal form mold, a separate thermal form mold may be used to form the inner package 120. Also, the halves of the inner package 120 may be provided to the primary package 105 before providing the outer package 130 to the inner package 120 and the primary package 105.

A computer may include the at least one processors and memory described in the present disclosure, and computer instructions stored in the memory may be configured to cause the at least one processors to control systems and machines of the present disclosure to perform the processes of manufacturing the custom packaging 100 described herein.

It should also be noted that although a few embodiments have been described, those skilled in the art will readily appreciate that many modifications are possible to the embodiments without materially departing from the novel teachings and advantages of the embodiments. Accordingly, all such modifications are intended to be included within the scope of the embodiments as shall be defined in the claims. Therefore, it is to be understood that the foregoing is illustrative of various embodiments and is not to be construed as limited to the specific embodiments illustrated.

The invention claimed is:

1. A method of forming a package that includes a primary package, an inner package configured to surround the primary package, an outer package including two bodies that are configured to surround opposite sides of the inner package, respectively, and tape, the method comprising:
   providing the outer package and the inner package around the primary package such that the outer package is provided around the inner package and the primary package, including:
      providing the inner package around the primary package, and
      providing the outer package around the inner package such that an air gap is formed between the inner package and the outer package; and
   sealing the two bodies of the outer package together with the tape after providing the inner package and the outer package around the primary package,
   wherein the providing the outer package and the inner package around the primary package includes providing the two bodies of the outer package around two bodies of the inner package, respectively, before providing the inner package around the primary package.

2. The method of claim 1, wherein
the outer package is provided around the inner package and the primary package, such that the air gap surrounds the primary package.

3. The method of claim 2, wherein
the inner package includes a body, configured to surround a part of the primary package, and a flange extending from the body of the inner package, and the flange is configured to suspend the inner package and the primary package, within the outer package, when the outer package is provided around the inner package and the primary package.

4. The method of claim 1, wherein the inner package includes a body, configured to surround a part of the primary package, and a flange extending from the body of the inner package, the outer package includes a first body of the two bodies, configured to surround a part of the inner package, and a flange extending from the first body of the outer package, and the providing the outer package around the inner package comprises contacting the flange of the outer package with the flange of the inner package.

5. A method of forming a package that includes a primary package, an inner package configured to surround the primary package, an outer package including two bodies that are configured to surround opposite sides of the inner package, respectively, and tape, the method comprising:

providing the outer package and the inner package around the primary package such that the outer package is provided around the inner package and the primary package, including:

providing the inner package around the primary package, and providing the outer package around the inner package such that an air gap is formed between the inner package and the outer package;

sealing the two bodies of the outer package together with the tape after providing the inner package and the outer package around the primary package; and forming the inner package in a thermal form process by using the primary package as a thermal forming mold.

6. The method of claim 5, wherein the providing the outer package and the inner package around the primary package includes providing the two bodies of the outer package around two bodies of the inner package, respectively, after providing the inner package around the primary package.

7. The method of claim 5, wherein the primary package includes perforations that cause the inner package to be drawn on the primary package during the thermal form process.

8. A method of forming a package that includes a primary package, an inner package configured to surround the primary package, an outer package including two bodies that are configured to surround opposite sides of the inner package, respectively, and tape, the method comprising:

providing the outer package and the inner package around the primary package such that the outer package is provided around the inner package and the primary package, including:

providing the inner package around the primary package, and providing the outer package around the inner package such that an air gap is formed between the inner package and the outer package; and sealing the two bodies of the outer package together with the tape after providing the inner package and the outer package around the primary package, wherein the tape includes a vent that is configured to allow air to pass between an outside of the outer package and an inside of the outer package, or the method further comprises providing the vent on the outer package.

9. The method of claim 8, wherein the tape includes the vent that is configured to allow the air to pass between an-the outside of the outer package and the inside of the outer package.

10. The method of claim 8, wherein the method further comprises providing the vent on the outer package.

11. A method of forming a package that includes a primary package, an inner package configured to surround the primary package, an outer package including two bodies that are configured to surround opposite sides of the inner package, respectively, and tape, the method comprising:

providing the outer package and the inner package around the primary package such that the outer package is provided around the inner package and the primary package, including:

providing the inner package around the primary package, and providing the outer package around the inner package such that an air gap is formed between the inner package and the outer package; and sealing the two bodies of the outer package together with the tape after providing the inner package and the outer package around the primary package, wherein the two bodies of the outer package are separated from each other by a gap of air when the tape seals the two bodies of the outer package together.

* * * * *